US010594785B2

(12) United States Patent
Rajamani et al.

(10) Patent No.: US 10,594,785 B2
(45) Date of Patent: Mar. 17, 2020

(54) TRANSITIONING FROM AN INFRASTRUCTURE BASED WIRELESS CONNECTION TO A PEER TO PEER (P2P) WIRELESS CONNECTION

(71) Applicant: Intel Corporation, Santa Clara, CA (US)

(72) Inventors: Krishnan Rajamani, San Diego, CA (US); Gary C. Huang, San Jose, CA (US); Xintian E Lin, Palo Alto, CA (US); Carl C. Hansen, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 786 days.

(21) Appl. No.: 15/067,972

(22) Filed: Mar. 11, 2016

(65) Prior Publication Data
US 2017/0264676 A1    Sep. 14, 2017

(51) Int. Cl.
| | | |
|---|---|---|
| *H04W 4/00* | (2018.01) | |
| *H04L 29/08* | (2006.01) | |
| *H04W 8/00* | (2009.01) | |
| *H04W 76/14* | (2018.01) | |
| *H04W 84/12* | (2009.01) | |
| *H04W 36/00* | (2009.01) | |

(Continued)

(52) U.S. Cl.
CPC .......... *H04L 67/104* (2013.01); *H04W 8/005* (2013.01); *H04W 36/03* (2018.08); *H04W 76/14* (2018.02); *H04W 84/12* (2013.01); *H04L 65/608* (2013.01); *H04W 80/06* (2013.01)

(58) Field of Classification Search
CPC ...... H04L 29/08; H04L 67/104; H04W 8/005; H04W 36/03; H04W 40/02; H04W 40/12; H04W 40/24; H04W 40/246; H04W 76/02; H04W 76/023; H04W 76/14; H04W 84/12
See application file for complete search history.

(56) References Cited

U.S. PATENT DOCUMENTS 7,577,125 B2 * 8/2009 Abhishek .............. H04W 72/02
370/338
8,554,970 B2 * 10/2013 Suumaki ................. H04W 4/08
710/303
(Continued)

FOREIGN PATENT DOCUMENTS

| CN | 108702601 | 10/2018 |
| WO | 2015111811 | 7/2015 |
| WO | 2017155680 | 9/2017 |

OTHER PUBLICATIONS

Sitorus et al, Establishment of Wi-Fi Display Session between Source and Sink Device in Wireless Android Screencasting, IEEE 6 pages, 2015.*

(Continued)

*Primary Examiner* — Frank Duong
(74) *Attorney, Agent, or Firm* — Schwegman Lundberg & Woessner, P.A.

(57) ABSTRACT

Disclosed in some examples are methods, systems, devices, and machine readable mediums which provide for device discovery and P2P negotiation in infrastructure mode and then a transition to P2P mode. This allows devices to take advantage of the robustness and improved device discovery of infrastructure mode and the reduced latency of P2P mode.

22 Claims, 6 Drawing Sheets

(51) Int. Cl.
  *H04W 80/06* (2009.01)
  *H04L 29/06* (2006.01)

(56) References Cited

U.S. PATENT DOCUMENTS

| | | | | |
|---|---|---|---|---|
| 8,792,429 | B2* | 7/2014 | Hassan | H04L 12/2818 |
| | | | | 370/329 |
| 9,736,766 | B2* | 8/2017 | Kim | H04W 76/14 |
| 9,980,121 | B2* | 5/2018 | Lee | H04W 48/14 |
| 2011/0103264 | A1 | 5/2011 | Wentink | |
| 2012/0134349 | A1* | 5/2012 | Jung | H04W 8/005 |
| | | | | 370/338 |
| 2012/0250576 | A1* | 10/2012 | Rajamani | H04W 40/24 |
| | | | | 370/254 |
| 2014/0211705 | A1 | 7/2014 | Baek | |
| 2014/0229627 | A1* | 8/2014 | Maeng | H04L 67/16 |
| | | | | 709/228 |
| 2014/0314065 | A1* | 10/2014 | Song | H04W 8/005 |
| | | | | 370/338 |
| 2015/0220296 | A1* | 8/2015 | Lin | H04W 76/14 |
| | | | | 345/2.3 |
| 2015/0351146 | A1* | 12/2015 | Lee | H04W 8/005 |
| | | | | 370/329 |
| 2016/0192405 | A1 | 6/2016 | Rajamani et al. | |
| 2018/0017629 | A1* | 1/2018 | Park | G01R 31/36 |

OTHER PUBLICATIONS

Wi-Fi Alliance, Wi-Fi Display Technical Specification Version 1.0.0, 149 pages, 2012.*

"International Application Serial No. PCT US2017 018424, International Preliminary Report on Patentability dated Sep. 20, 2018", 11 pgs.

"International Application Serial No. PCT US2017 018424, International Search Report dated May 22, 2017", 4 pgs.

"International Application Serial No. PCT US2017 018424, Written Opinion dated May 22, 2017", 9 pgs.

"European Application Serial No. 17763727.9, Extended European Search Report dated Sep. 3, 2019", 11 pgs.

"European Application Serial No. 17763727.9, Response filed Dec. 3, 2019 to Extended European Search Report dated Sep. 3, 2019", 25 pgs.

* cited by examiner

TRANSITIONING FROM AN INFRASTRUCTURE BASED WIRELESS CONNECTION TO A PEER TO PEER (P2P) WIRELESS CONNECTION

TECHNICAL FIELD

Embodiments pertain to wireless technologies. Some embodiments relate to efficient switching between infrastructure based wireless connections to P2P based wireless connections.

BACKGROUND

Typical Wireless Local Area Networks (WLANs) that are implemented in accordance with an Institute for Electrical and Electronics Engineers (IEEE) 802.11 family of standards operate in an infrastructure mode. Infrastructure mode is where access points (APs) create and announce the presence of a WLAN. Client devices scan the air interface and read the announcements to discover the existence of the WLAN. Devices may then connect to these APs to receive services from the AP such as Internet access. The AP and the client devices each have defined roles which dictate how the client devices and the AP communicate with one another. All communications in infrastructure mode involve communicating through the AP. Thus, if two connected clients want to communicate with each other, they must communicate through the AP.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
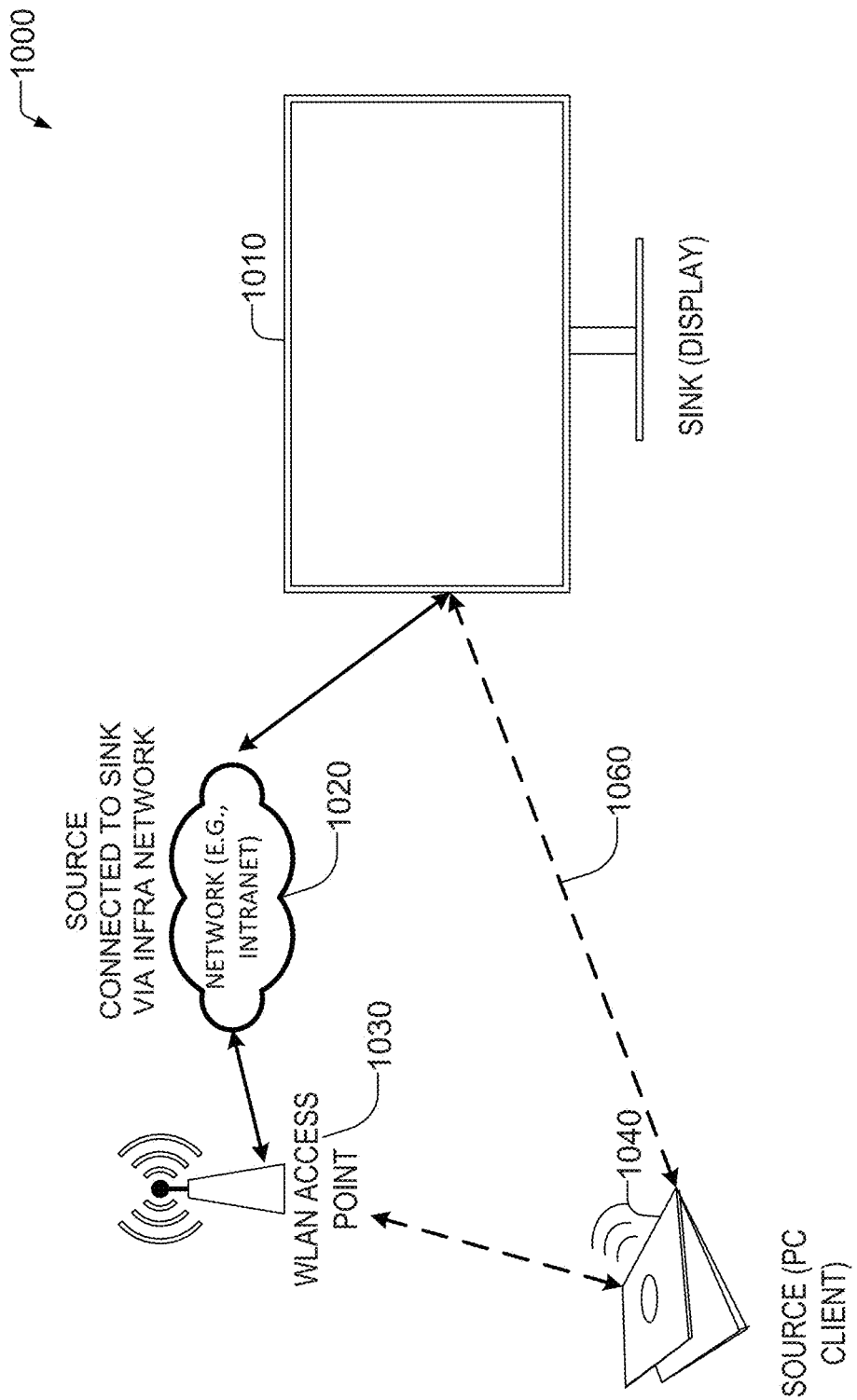
FIG. 1 shows an example wireless connection environment according to some examples of the present disclosure.

For some applications, infrastructure mode is not optimal. For example, wireless media technologies allow for media sources (such as a computing device) to send or stream media to a sink device (e.g., a display). Using infrastructure mode for this application can cause media playback lag and in some cases jitter because of the increased latency introduced by the lack of a direct connection between the source device and the sink device.

Wi-Fi Direct is a wireless standard which specifies protocols and techniques used by devices to connect to one another without a wireless access point or other infrastructure. Wi-Fi Direct is an example of a wireless Peer-to-Peer technology (P2P) where two wireless devices talk directly to each other without the use of an intermediary such as an access point or a base station. Wi-Fi Direct devices communicate with each other using P2P Groups. A group owner (GO) provides functionality similar to that of a WLAN AP in a traditional infrastructure mode. Setting up a Wi-Fi Direct connection may involve device discovery, service discovery, group formation, authentication, and negotiating a group owner.

P2P technologies such as Wi-Fi Direct have been applied to a number of applications including media streaming applications such as wireless display. Wireless display applications use P2P to stream content from a source device (e.g., a mobile phone or other content source) to a sink device (a wireless display). P2P wireless display applications make more efficient use of the limited wireless spectrum and bandwidth than traditional infrastructure communications as the media is communicated directly from the source device to the sink device. While the performance of P2P wireless display applications may be faster because of the direct link, these P2P applications suffer from other issues. For example, device discovery and connection is less robust, takes longer to connect (due to the additional procedures required by P2P connection protocols), and adds additional complexity. For example, P2P wireless display applications may entail additional complexity where, for example, the P2P connection requires the P2P link to be on a different channel than the infrastructure connection (e.g., due to regulatory reasons).

In order to address these problems, attempts have been made to improve infrastructure mode that addresses the delay associated with the indirect connection between the source device and the sink device. Despite these improvements, these solutions depend on network administrators to properly configure and setup their networks to accommodate this solution. This is not always an acceptable or popular solution.

Disclosed in some examples are methods, systems, devices, and machine readable mediums which perform wireless device discovery, P2P switching capability discovery, and P2P connection parameter messaging in infrastructure mode, and then transition to P2P mode. This allows wireless devices to take advantage of both the robustness and improved device discovery of infrastructure mode and the reduced latency of P2P mode. In some examples, the wireless device discovery, P2P switching capability discovery, and P2P connection parameter messaging may be done using communication protocols that are above a medium access control (MAC) layer in a protocol stack. For example, a transport or application protocol layer. In some examples, media streaming may also start over infrastructure mode and then transition to P2P mode to reduce a delay between connection and media streaming.

A first and a second wireless device first authenticate and associate with an infrastructure device (e.g., an AP) or otherwise become communicatively coupled to the infrastructure device. Communications occurring through the infrastructure device are termed infrastructure mode communications. Peer discovery then takes place using infrastructure mode communications. During peer discovery, the first and second wireless devices discover each other. Once the wireless devices discover each other they may determine whether they both are capable and willing to transition to a P2P connection. In some examples the wireless devices may determine their willingness to transition to a P2P connection using information exchanged in one or more discovery protocol messages sent as part of peer discovery. In some examples, in addition to the willingness information, the peers may exchange or discover P2P connection parameters, such as Group Owner, channel, MAC addresses, and the like.

In other examples, rather than exchange information through discovery messages, after peer discovery, the devices may establish one or more protocol connections to exchange information. Example protocol connections include transport layer and application layer protocol connections over the infrastructure mode. For example, the wireless devices may establish a Transmission Control Protocol (TCP) session. The wireless devices may determine their willingness to transition to a P2P connection using information exchanged over these protocol connections. In some examples, in addition to the willingness information, the peers may exchange or discover P2P connection parameters over the protocol connections. The wireless devices may also setup and begin streaming media using infrastructure mode communications over the protocol connections. For example, the wireless devices may establish TCP, Real Time Streaming Protocol (RTSP), and Real Time Transport Protocol (RTP) connections and begin streaming media. These examples allow media to begin streaming faster than waiting until the switch to the P2P connection.

The peers may then switch to a P2P connection, in some examples, in accordance with the agreed upon P2P connection parameters. Communications using the P2P connection are termed P2P mode communications. If the wireless devices began streaming media using the infrastructure mode communications, the streaming may be switched to the P2P mode communications.

Turning now to FIG. 1, an example wireless connection environment 1000 is shown according to some examples of the present disclosure. In some examples, wireless devices in a media streaming environment may be termed a source device—which designates this wireless device as the source of streaming media—or a sink device, which designates this device as a destination of the media. Source device 1040 and sink device 1010 are communicatively coupled to each other through WLAN Access Point 1030. For example, source device 1040 is authenticated and associated with WLAN Access Point 1030. Sink device 1010 is communicatively coupled to WLAN Access Point 1030 through network 1020. Source device 1040 (shown as a laptop computer) may discover sink device 1010 (shown as a television) over the infrastructure mode communications provided by the WLAN Access Point 1030 and in some examples, other network elements (such as portions of network 1020). In some examples, source device 1040 and sink device 1010 may be communicatively coupled (e.g., connected) wirelessly or through a wired connection directly to WLAN Access Point 1030. In other examples, and as shown with respect to Sink 1010 in FIG. 1, one or both of the wireless devices may be communicatively coupled (wired or wirelessly) to WLAN Access Point 1030 by or through other network elements. In FIG. 1, a wireless connection is denoted by a dotted line, whereas a wired connection is denoted by a solid line.

Sink device 1010 and source device 1040 may discover each other by utilizing the infrastructure mode communications their common connectivity with WLAN Access Point 1030 affords. Once source device 1040 and sink device 1010 are communicatively coupled to WLAN Access Point 1030, source device 1040 and sink device 1010 may utilize one or more discovery and connection protocols to discover each other and the services each device provides. Example protocols include Simple Service Discovery Protocol (SSDP), Universal Plug and Play (UPnP), Multicast Domain Name System (mDNS), mDNS over Application Service Platform 2 (ASP2), and the like. As an example discovery method, a device may broadcast, or multicast a User Datagram Protocol (UDP) packet to a designated IP address and port to advertise the device's availability and services. Other devices may listen for these packets to discover the sending device and the services it offers.

In some examples, the discovery messages may include an indication of the ability of the device to switch to a P2P mode. In some examples, the discovery messages may also convey one or more P2P connection parameters. Example P2P connection parameters include Group Owner (GO) polarity, GO channel, MAC addresses and the like. As a result of determining through the discovery messages that the source device 1040 and the sink device 1010 support switching to P2P mode, the source device 1040 and the sink device 1010 may establish a P2P connection 1060 (e.g., a Wi-Fi Direct connection, a 802.11z family of standards promulgated by the Institute for Electrical and Electronics Engineers (IEEE), and the like).

Once a P2P connection is established, the source device 1040 may setup a media streaming session (e.g., a wireless display session) and begin streaming media. For example, the source device 1040 and the sink device 1010 may setup RTSP and Real Time Transport Protocol (RTP) sessions. Once these sessions are setup, the source device 1040 may send and the sink device 1010 may receive and consume the media. Consuming the media includes playing, presenting, or displaying the received streaming media. Streaming protocols may include Real Time Transport Protocol (RTP), Motion Picture Experts Group-Transport Stream (MPEG-TS), and the like using codecs such as H.264, H.265, Advanced Audio Coding (AAC), Linear Pulse-Code Modulation (LPCM), and the like.

In another example method of transitioning between infrastructure mode communications and P2P mode communications, once the source device 1040 discovers the sink device 1010 they may establish one or more protocol connections using infrastructure mode communications. This is in contrast to an implementation where the discovery protocols were used to exchange this information. For example, the devices may setup one or more transport and application layer protocol connections using protocols such as a TCP, Real Time Streaming Protocol (RTSP) session, and the like. One or both of sink device 1010 and source device 1040 may convey the ability to switch to a P2P connection to the other device using these protocols and the connectivity they provide. Additionally, one or more P2P connection parameters may be exchanged over the established infrastructure mode communications. For example, the devices may determine which device will be the Group Owner, which wireless channel the P2P session will use, exchange Medium Access Control (MAC) addresses, and other information. In some examples, if the infrastructure-based protocol connections includes an RTSP session, an RTSP GET PARAMETER (e.g., M3) message may be utilized to discover the capability and P2P connection parameters.

During this time, source device 1040 and sink device 1010 may setup a media streaming (e.g., wireless display) session using infrastructure mode communications and begin streaming media. For example, source device 1040 and sink device 1010 may setup a RTSP session (if it was not already setup previously) and a Real Time Transport Protocol (RTP) session. Once the RTP session is setup, source device 1040 may send and sink device 1010 may receive and consume the media. Consuming the media includes playing, or displaying the received streaming media. Streaming protocols may include Real Time Transport Protocol (RTP), Motion Picture Experts Group-Transport Stream (MPEG-TS), and the like using codecs such as H.264, H.265, Advanced Audio Coding (AAC), Linear Pulse-Code Modulation (LPCM), and the like.

Sometime during the streaming of the media from the source device 1040 to sink device 1010, source device 1010 may signal the switch to a P2P connection. Once the switch to the P2P connection is signaled, the P2P link is established. In some examples, the P2P link is established according to the WiFi Direct standards. The establishment of the P2P link may be speed up by utilizing the P2P connection parameters exchanged over the established infrastructure protocol connections. In some examples an RTSP SET PARAMATER (e.g., M4) message may be utilized to signal an intention to switch to the P2P link.

Once the P2P link is established, the wireless display session is started on the P2P link. For example, parallel RTSP and RTP sessions are initiated over the P2P link, where the RTSP and RTP sessions are similar or the same as those instantiated over the WLAN AP 1030 and network 1020 infrastructure. The media stream is then routed over the P2P link and the infrastructure link may be torn down. For example, using RTSP, the media stream is "PAUSEd" on the infrastructure connection and then "PLAYed" on the P2P connection.

In some examples, source device 1040 may not begin streaming on the infrastructure connection, instead opting to wait until the P2P connection is established. This may introduce connection delay that is noticeable to a user. If source device 1040 streams over the infrastructure connection, the delay in establishing the P2P connection is fully masked from the user by overlapping the P2P connection establishment with the streaming over the infrastructure mode.

In some examples, the media streaming may be subject to content protection, such as High-Bandwidth Digital Content Protection (HDCP). The source device 1040 may defer link HDCP until after the switch to the P2P connection.

Furthermore, in some examples, devices 1040 and 1010 may revert from streaming over the P2P connection to streaming across the infrastructure connection. For example, the P2P connection may become unreliable in that one or more quality metrics may deviate from a threshold quality level (e.g., a Received Signal Strength may be below a threshold, a packet error rate may exceed a threshold, and the like). To improve the speed of this transition, the infrastructure connection, including protocol connections such as TCP and RTSP may be left open while the P2P streaming is ongoing. Thus, all that needs to be done is to send a switch command. For example, a "PAUSE" command on the P2P connection and then a "PLAY" command on the infrastructure connection.

In some examples, source device 1040 or sink device 1010 may have one or more administrator policies that may dictate if and under what conditions sending or receiving media streams may occur over P2P and under what conditions sending or receiving media streams may occur over infrastructure modes. For example, in some scenarios, it is not possible to switch to a P2P connection without losing the "same channel" benefits of the infrastructure connection. These same channel benefits include improved display AV latency, WLAN power save, and the like. One example scenario is where sink device 1010 is provisioned as a group owner on a separate channel. In these examples, source device 1040 may utilize the administrator policies to determine how to proceed. Options include switching to P2P or staying with infrastructure mode.

Figure 2:
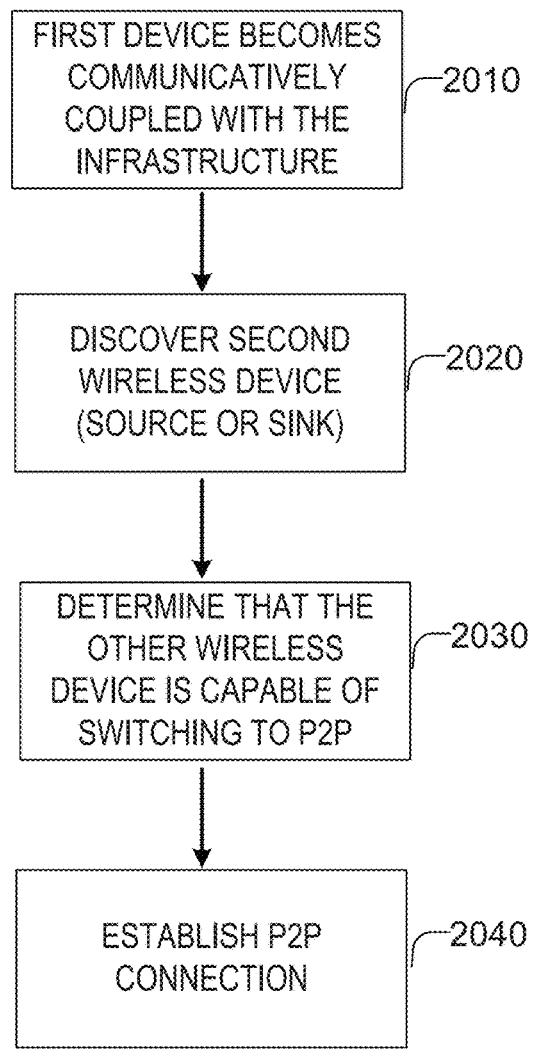
FIG. 2 shows a flowchart of a method of a first wireless device establishing a P2P connection with a second wireless device according to some examples of the present disclosure.

Turning now to FIG. 2, a method 2000 of a first wireless device establishing a P2P connection with a second wireless device is shown according to some examples of the present disclosure. The wireless device may be a source device, a sink device, or any wireless device capable of both infrastructure communications and P2P communications. At operation 2010, the first device becomes communicatively coupled with an infrastructure device. For example, associating and authenticating with an AP in accordance with an 802.11 family of standards. At operation 2020, the first device may discover a second wireless device, the second wireless device that is communicatively coupled with the infrastructure, for example, source devices or sink devices. Discovery may be performed in accordance with one or more discovery protocols, such as Simple Service Discovery Protocol (SSDP), Universal Plug and Play (UPnP), Multicast Domain Name System (mDNS), mDNS over ASP2, and the like.

At operation 2030, the first wireless device determines whether a discovered second wireless device supports switching to a P2P wireless connection. This discovery may be made during the device discovery of operation 2030. For example, one of the discovery protocol messages (e.g., a broadcast message) announcing the presence of the second wireless device may also signal that the second wireless device is capable of switching to a P2P mode. Furthermore, the discovery protocol messages may be used to exchange P2P connection parameters. In other examples, the first wireless device and the second wireless device may establish one or more transport and/or application layer protocol connections in order to exchange information on the ability to switch to a P2P connection and P2P connection parameters.

In some examples, during this time, the source device 1040 and the sink device 1010 may setup a media streaming (e.g., wireless display) session using infrastructure mode communications and begin streaming media. This option allows for faster media connectivity and reduces delay experienced by a user.

At operation 2040, the first wireless device and the second device may establish the P2P connection. If the first wireless device and the second wireless device exchanged P2P connection parameters, these may be used to establish the P2P connection. In an example, the P2P connection may be a Wi-Fi Direct connection, an 802.11z connection (also known as Tunneled Direct Link Setup TDLS), or the like. After the P2P connection is established the wireless devices may communicate with each other directly without the use of an infrastructure device such as an AP using P2P mode communications. For example, the devices could establish a wireless display session. If the devices established a wireless display session using infrastructure mode communications, the wireless display session may be moved to the P2P connection.

Figure 3:
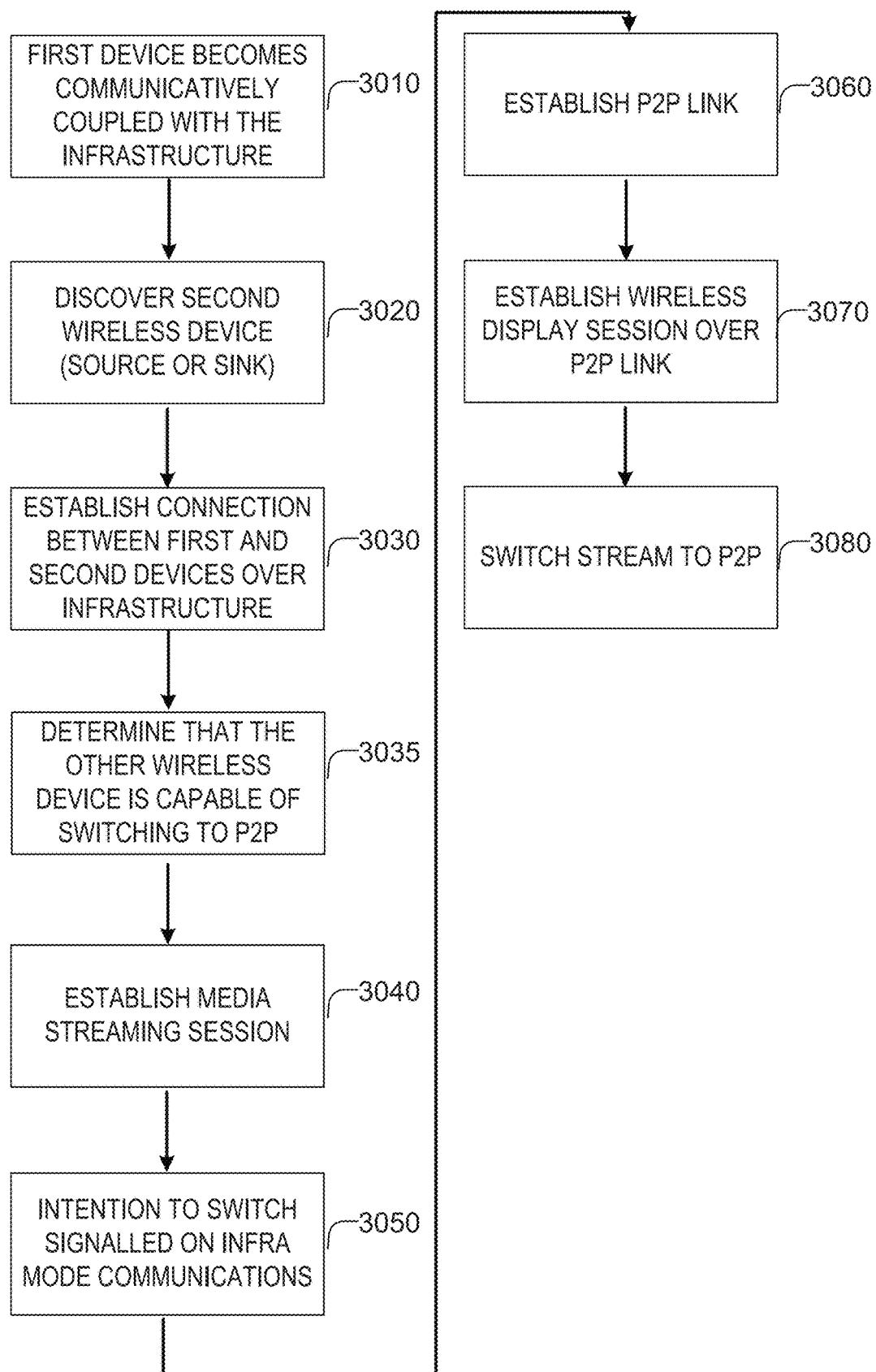
FIG. 3 shows a flowchart of a more detailed method of a first wireless device establishing a P2P connection with a second wireless device is shown according to some examples of the present disclosure.

Turning now to FIG. 3, a more detailed method 3000 of a first wireless device establishing a P2P connection with a second wireless device is shown according to some examples of the present disclosure. In FIG. 3, the first wireless device establishes a connection to the second wireless device using infrastructure mode communications. For example, the first and second wireless device establishes a TCP connection, an RTSP connection, and in some examples, an RTP connection. At operation 3010, the first wireless device becomes communicatively coupled with the infrastructure. For example, the first wireless device associates and authenticates with the infrastructure device. At operation 3020, the first wireless device discovers a second wireless device. As already noted, this may be accomplished according to one or more discovery protocols. In addition to discovering the existence of the second wireless device, the discovery protocols provide a method of discovering contact information of the second wireless device, such as an Internet Protocol (IP) address.

At operation 3030, the first and second wireless devices establish a connection using the infrastructure mode communications. For example, the devices establish one or more of: a transport layer protocol connection (e.g., TCP), an application layer protocol connection (e.g., RTSP, RTP), and the like. In some examples, at operation 3035, these protocol sessions are used to communicate an ability of the first and/or second device to switch to P2P mode, and in some examples, these protocol sessions may be used to exchange one or more P2P connection parameters.

At operation 3040, the first and second wireless device may establish a media streaming session, such as a wireless display session. For example, one or more application layer protocol sessions may be established (if they were not already established at operation 3030) such as RTSP and RTP. RTSP may be used to control the media stream, whereas the RTP session may be utilized to actually transfer media content. The first and second wireless devices may transmit video and/or audio from the source device (one of the first or second devices) to the sink device (the other of the first or second devices).

At operation 3050, the first or second wireless device may signal an intention to switch to a P2P connection using infrastructure mode communications (such as the connection established in operation 3030). At operation 3060, the P2P connection may be established. In some examples, the connection establishment may be established using previously exchanged (e.g., at operation 3030) P2P connection parameters. At operation 3070, the first and second wireless device may establish a media streaming session (such as a wireless display session) on the P2P connection using P2P mode communications. For example, one or more transport layer protocol connections (e.g., TCP), application layer protocol connections, and the like may be established (if they were not already established at operation 3060) such as RTSP and RTP. RTSP may be used to control the media stream, whereas the RTP session may be utilized to actually transfer media content. At operation 3080, the first and second wireless devices may switch the transmitted video and/or audio from the infrastructure mode communications to the P2P mode communications.

Figure 4:
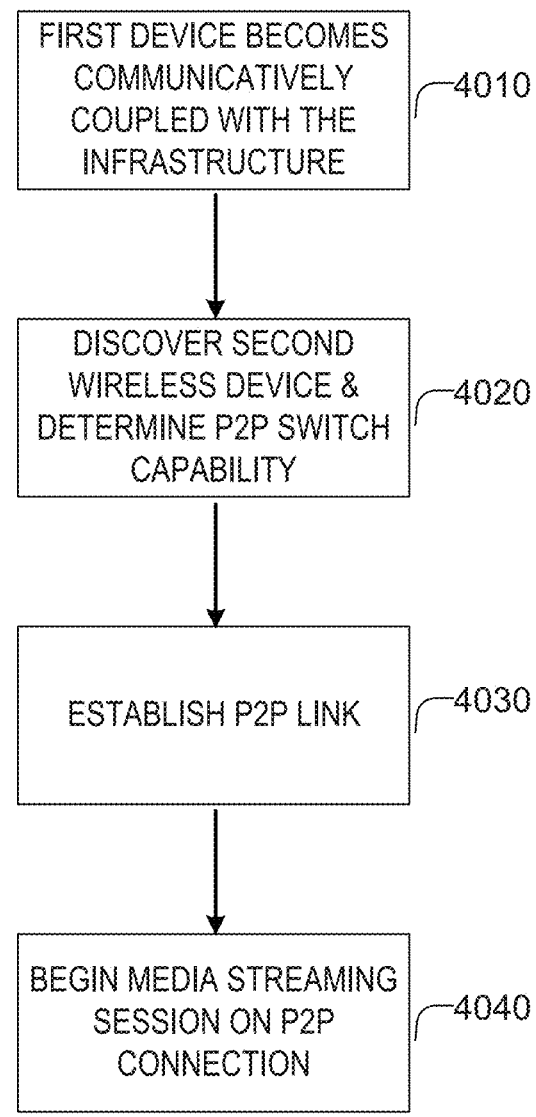
FIG. 4 shows a flowchart of a second method of a first wireless device establishing a P2P connection with a second wireless device according to some examples of the present disclosure.

Turning now to FIG. 4, a second method 4000 of a first wireless device establishing a P2P connection with a second wireless device is shown according to some examples of the present disclosure. In FIG. 4, the first and second devices exchange the capability of switching between infrastructure and P2P, and in some examples, P2P connection parameters during the discovery process rather than establishing transport and/or application layer connections. At operation 4010, the first device becomes communicatively coupled with the infrastructure. For example the first wireless device associates and authenticates with the infrastructure device. At operation 4020, the second wireless device is discovered and the ability of the second device to switch from an infrastructure connection to a P2P connection is also discovered. As already noted, this may be accomplished using discovery protocol messages of a discovery protocol. During this process, the first wireless device and second wireless device may also discover or negotiate one or more P2P connection parameters. At operation 4030, the P2P link may be established. In some examples, the P2P link may be established in accordance with the P2P connection parameters. At operation 4040, a media streaming session (e.g., a wireless display session) may be created on the P2P connection and media streaming may begin.

Figure 5:
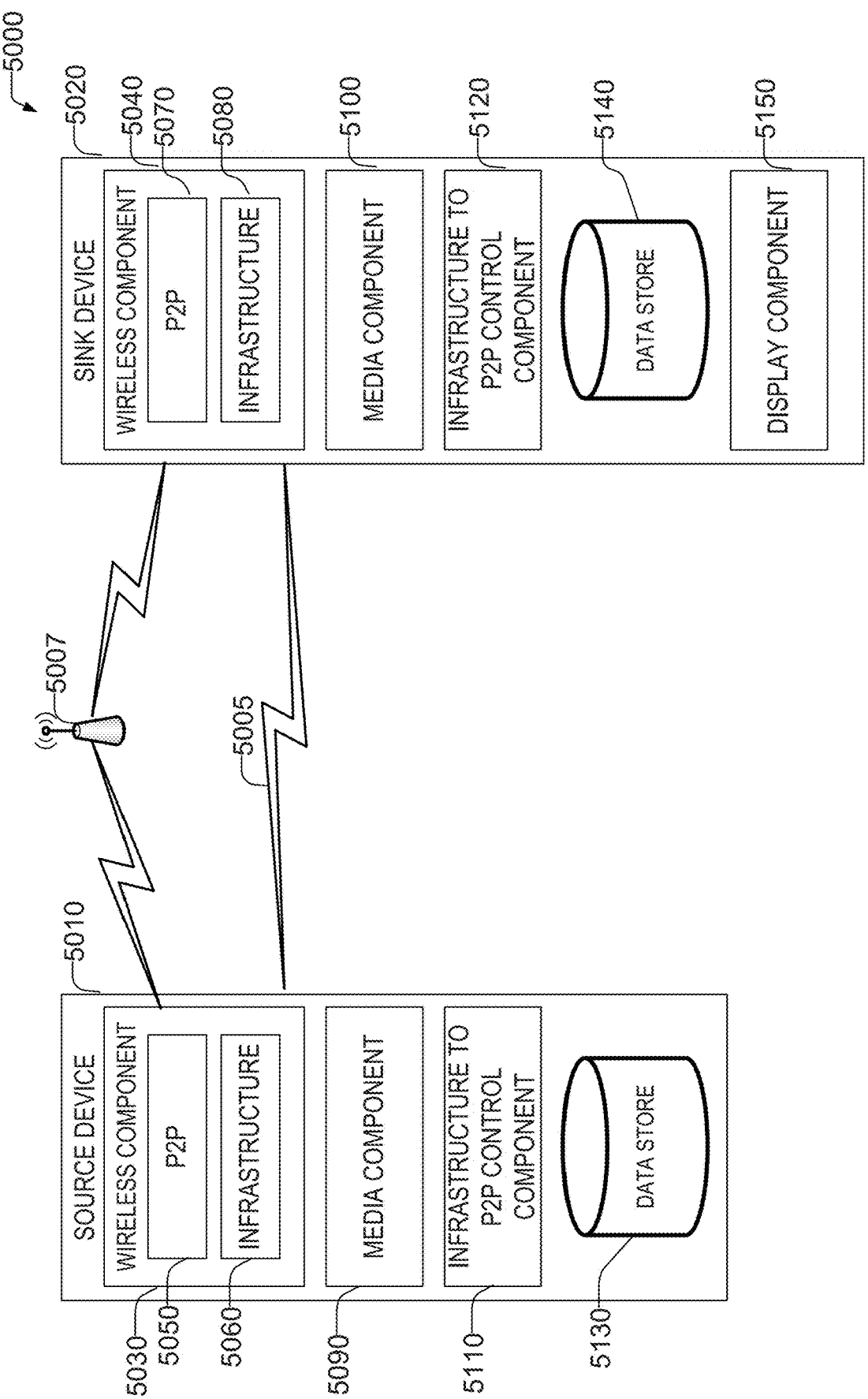
FIG. 5 shows a logical schematic of a source wireless device and a sink wireless device according to some examples of the present disclosure.

Turning now to FIG. 5, a logical schematic 5000 of a source wireless device 5010 and a sink wireless device 5020 are shown according to some examples of the present disclosure. A source wireless device 5010 is a device that sends media to a sink wireless device 5020 which consumes the media. The term "wireless device" as used herein is generic and encompasses either the source or sink wireless devices—thus, the operations of FIGS. 2-4 may be performed by either a source or a sink wireless device. Source wireless device 5010 and sink wireless device 5020 may communicate with each other using a P2P mode communications 5005 or using an infrastructure mode communication 5007. Source wireless device 5010 and sink wireless device 5020 may have respective wireless components 5030 and 5040. Wireless components 5030 and 5040 may implement one or more aspects, protocols and layers of a wireless communication standard, such as an IEEE 802.11 family of standards, Wi-Fi Direct standards promulgated by the Wi-Fi Alliance, an LTE family of standards promulgated by the Third Generation Partnership Project (3GPP), an LTE-Advanced family of standards and the like. Wireless components 5030 and 5040 may implement a physical layer, medium access control layer (MAC), a logical link control layer and the like. Other protocols may include Radio Link Control (RLC) layer, Packet Data Convergence Protocol (PDCP), and the like. In some examples, wireless component 5030 may also setup one or more transport protocols such as TCP. Wireless components 5030 and 5040 may have P2P components 5050 and 5070 respectively which may handle the P2P connections and protocols for the wireless components 5030 and 5040 respectively. Similarly, wireless components 5030 and 5040 may have respective infrastructure components 5060 and 5080 to handle the infrastructure connections and protocols for the wireless components.

Source wireless device 5010 may have a media component 5090 responsible for streaming media to sink wireless device 5020. Sink wireless device 5020 may also have a media component 5100. These components 5090 and 5100 may implementing one or more application-layer protocols such as RTSP, RTP, and the like to implement media streaming such as wireless display applications. These components 5090 and 5100 may also implement one or more encoding or decoding operations.

Source wireless device 5010 and sink wireless device 5020 may have an infrastructure to P2P control component 5110 and 5120, respectively. This component 5110 and 5120 may control the discovery of other wireless devices; P2P capability and connection parameter exchange over infrastructure communications mode; P2P establishment; media streaming establishment, termination and transfer; and the like. For example, the infrastructure to P2P control components 5110 and 5120 may control the processes described in FIGS. 2-4.

Source wireless device 5010 and sink wireless device 5020 may include respective data stores 5130 and 5140 for storing data. Data stores 5130 and 5140 may store P2P connection parameters, information about discovered wireless devices (e.g., IP address, MAC address, services provided, and the like), media files, and the like.

Sink wireless device 5020 may contain a display component 5150 that may interface with one or more integral or external displays and/or speakers. For example, media streamed from the source wireless device 5010 may be transmitted to sink wireless device 5020 using either P2P mode communications or infrastructure mode communications. Media component 5100 may decode the media and pass it to display component 5150 which may render one or more frames of video for presentation on a display.

Figure 6:
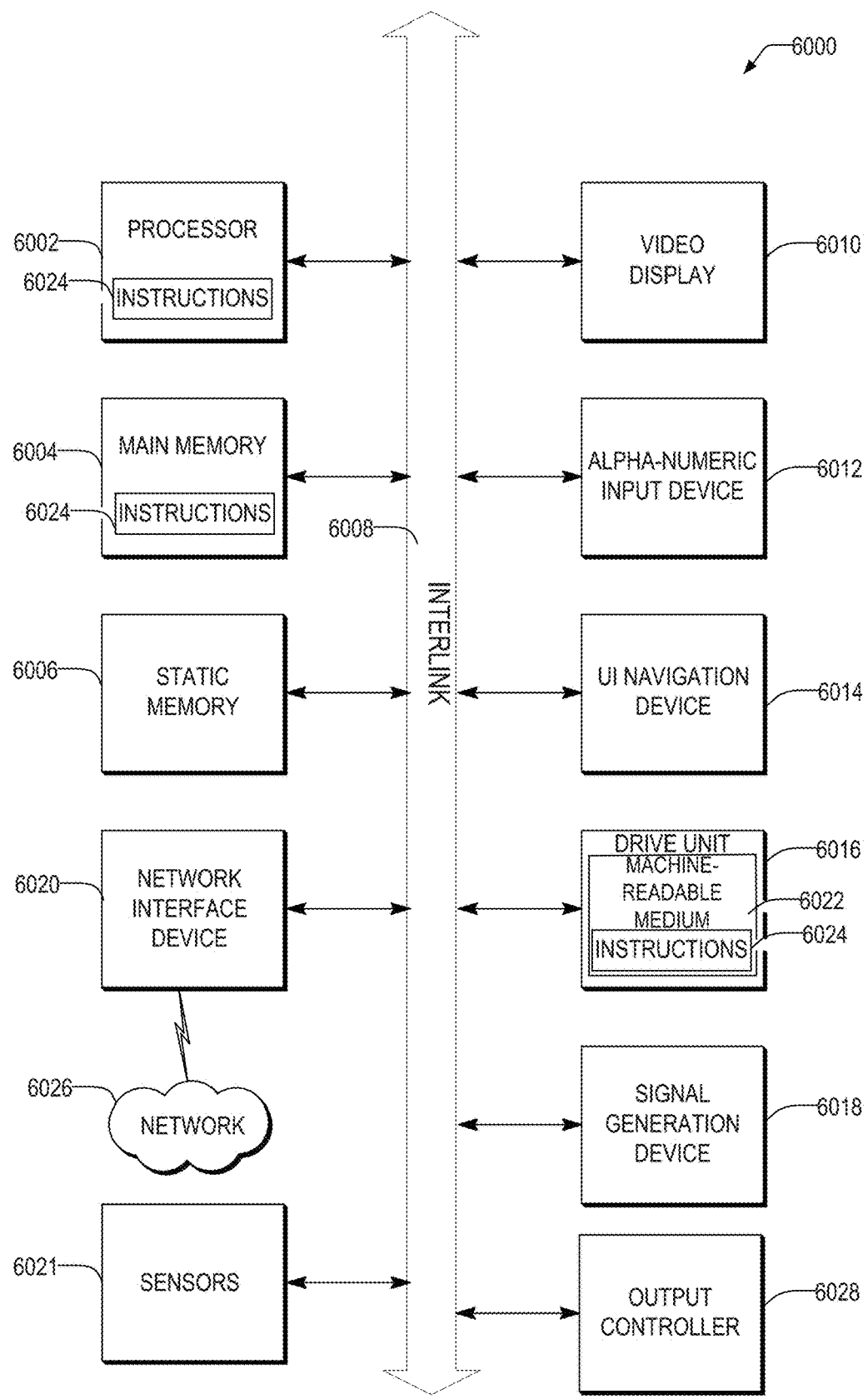
FIG. 6 is a block diagram illustrating an example of a machine upon which one or more embodiments may be implemented.

FIG. 6 illustrates a block diagram of an example machine 6000 upon which any one or more of the techniques (e.g., methodologies) discussed herein may perform. In alternative embodiments, the machine 6000 may operate as a standalone device or may be connected (e.g., networked) to other machines. In a networked deployment, the machine 6000 may operate in the capacity of a server machine, a client machine, or both in server-client network environments. In an example, the machine 6000 may act as a peer machine in peer-to-peer (P2P) (or other distributed) network environment. The machine 6000 may be a wireless device including a source device or a sink device, a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 6000 may include a hardware processor 6002 (e.g., a central processing unit (CPU), a graphics processing unit (GPU), a hardware processor core, or any combination thereof), a main memory 6004 and a static memory 6006, some or all of which may communicate with each other via an interlink (e.g., bus) 6008. The machine 6000 may further include a display unit 6010, an alphanumeric input device 6012 (e.g., a keyboard), and a user interface (UI) navigation device 6014 (e.g., a mouse). In an example, the display unit 6010, input device 6012 and UI navigation device 6014 may be a touch screen display. The machine 6000 may additionally include a storage device (e.g., drive unit) 6016, a signal generation device 6018 (e.g., a speaker), a network interface device 6020, and one or more sensors 6021, such as a global positioning system (GPS) sensor, compass, accelerometer, or other sensor. The machine 6000 may include an output controller 6028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 6016 may include a machine readable medium 6022 on which is stored one or more sets of data structures or instructions 6024 (e.g., software) embodying or utilized by any one or more of the techniques or functions described herein. The instructions 6024 may also reside, completely or at least partially, within the main memory 6004, within static memory 6006, or within the hardware processor 6002 during execution thereof by the machine 6000. In an example, one or any combination of the hardware processor 6002, the main memory 6004, the static memory 6006, or the storage device 6016 may constitute machine readable media.

While the machine readable medium 6022 is illustrated as a single medium, the term "machine readable medium" may include a single medium or multiple media (e.g., a centralized or distributed database, and/or associated caches and servers) configured to store the one or more instructions 6024.

The term "machine readable medium" may include any medium that is capable of storing, encoding, or carrying instructions for execution by the machine 6000 and that cause the machine 6000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 6024 may further be transmitted or received over a communications network 6026 using a transmission medium via the network interface device 6020.

The machine 6000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 6020 may include one or more physical jacks (e.g., Ethernet, coaxial, or phone jacks) or one or more antennas to connect to the communications network 6026. In an example, the network interface device 6020 may include a plurality of antennas to wirelessly communicate using at least one of single-input multiple-output (SIMO), multiple-input multiple-output (MIMO), or multiple-input single-output (MISO) techniques. In some examples, the network interface device 6020 may wirelessly communicate using Multiple User MIMO techniques.

OTHER NOTES AND EXAMPLES

Example 1 is a method comprising: at a first wireless device using a processor: establishing a first wireless connection with a wireless access infrastructure device; discovering, using the first wireless connection, a second wireless device, the second wireless device communicatively connected to the wireless access infrastructure device; determining that the second wireless device is capable of switching to a peer-to-peer wireless connection using a communication protocol that is above a Medium Access Control Protocol in a protocol stack; and establishing a peer-to-peer wireless connection with the second wireless device.

In Example 2, the subject matter of Example 1 optionally includes, wherein determining that the second wireless device is capable of switching to the peer-to-peer wireless connection comprises using information in a discovery protocol message sent by the second wireless device as part of discovering the second wireless device.

In Example 3, the subject matter of any one or more of Examples 1-2 optionally include determining a peer-to-peer connection parameter using information in a discovery protocol message sent by the second wireless device as part of discovering the second wireless device, and wherein establishing the peer-to-peer wireless connection with the second wireless device comprises using the peer-to-peer connection parameter.

In Example 4, the subject matter of any one or more of Examples 1-3 optionally include: establishing a protocol connection with the second wireless device using the first wireless connection, wherein determining that the second wireless device is capable of switching to the peer-to-peer wireless connection comprises utilizing the protocol connection, the protocol connection being one of: a transport layer protocol or an application layer protocol.

In Example 5, the subject matter of Example 4 optionally includes, wherein the protocol connection is a Transport Control Protocol (TCP).

In Example 6, the subject matter of any one or more of Examples 4-5 optionally include, wherein the protocol connection is a Real Time Streaming Protocol.

In Example 7, the subject matter of any one or more of Examples 4-6 optionally include: determining a peer-to-peer connection parameter using the protocol connection; and wherein establishing the peer-to-peer wireless connection comprises using the peer-to-peer connection parameter.

In Example 8, the subject matter of any one or more of Examples 4-7 optionally include: streaming a media file to the second wireless device using the first wireless connection using the protocol connection; and subsequent to establishing the peer-to-peer wireless connection with the second wireless device, switching the streaming of the media file from the first wireless connection to the peer-to-peer wireless connection.

In Example 9, the subject matter of Example 8 optionally includes, wherein streaming the media file comprises streaming the media file using a Real Time Transport Protocol (RTP).

In Example 10, the subject matter of any one or more of Examples 1-9 optionally include, wherein the peer-to-peer wireless connection is a Wi-Fi Direct connection.

Example 11 is a non-transitory machine readable medium comprising instructions, which when performed by the machine cause the machine to perform the operations comprising: establishing at a first wireless device a first wireless connection with a wireless access infrastructure device; discovering, using the first wireless connection, a second wireless device, the second wireless device communicatively connected to the wireless access infrastructure device; determining that the second wireless device is capable of switching to a peer-to-peer wireless connection using a communication protocol that is above a Medium Access Control Protocol in a protocol stack; and establishing a peer-to-peer wireless connection with the second wireless device.

In Example 12, the subject matter of Example 11 optionally includes, wherein the operations of determining that the second wireless device is capable of switching to the peer-to-peer wireless connection comprises using information in a discovery protocol message sent by the second wireless device as part of discovering the second wireless device.

In Example 13, the subject matter of any one or more of Examples 11-12 optionally include, wherein the operations comprise determining a peer-to-peer connection parameter using information in a discovery protocol message sent by the second wireless device as part of discovering the second wireless device, and wherein the operations of establishing the peer-to-peer wireless connection with the second wireless device comprises using the peer-to-peer connection parameter.

In Example 14, the subject matter of any one or more of Examples 11-13 optionally include, wherein the operations comprise establishing a protocol connection with the second wireless device using the first wireless connection; and wherein the operations of determining that the second wireless device is capable of switching to the peer-to-peer wireless connection comprises utilizing the protocol connection, the protocol connection being one of: a transport layer protocol or an application layer protocol.

In Example 15, the subject matter of Example 14 optionally includes, wherein the protocol connection is a Transport Control Protocol (TCP).

In Example 16, the subject matter of any one or more of Examples 14-15 optionally include, wherein the protocol connection is a Real Time Streaming Protocol.

In Example 17, the subject matter of any one or more of Examples 14-16 optionally include, wherein the operations comprise determining a peer-to-peer connection parameter using the protocol connection; and wherein the operations of establishing the peer-to-peer wireless connection comprises using the peer-to-peer connection parameter.

In Example 18, the subject matter of any one or more of Examples 14-17 optionally include, wherein the operations comprise: streaming a media file to the second wireless device using the first wireless connection using the protocol connection; and subsequent to establishing the peer-to-peer wireless connection with the second wireless device, switching the streaming of the media file from the first wireless connection to the peer-to-peer wireless connection.

In Example 19, the subject matter of Example 18 optionally includes, wherein streaming the media file comprises streaming the media file using a Real Time Transport Protocol (RTP).

In Example 20, the subject matter of any one or more of Examples 11-19 optionally include, wherein the peer-to-peer wireless connection is a Wi-Fi Direct connection.

Example 21 is a wireless device comprising: a processor; a memory communicatively coupled to the processor and comprising instructions, which when performed by the processor causes the processor to perform the operations comprising: establishing at a first wireless device a first wireless connection with a wireless access infrastructure device; discovering, using the first wireless connection, a second wireless device, the second wireless device communicatively connected to the wireless access infrastructure device; determining that the second wireless device is capable of switching to a peer-to-peer wireless connection using a communication protocol that is above a Medium Access Control Protocol in a protocol stack; and establishing a peer-to-peer wireless connection with the second wireless device.

In Example 22, the subject matter of Example 21 optionally includes, wherein the operations of determining that the second wireless device is capable of switching to the peer-to-peer wireless connection comprises using information in a discovery protocol message sent by the second wireless device as part of discovering the second wireless device.

In Example 23, the subject matter of any one or more of Examples 21-22 optionally include, wherein the operations comprise determining a peer-to-peer connection parameter using information in a discovery protocol message sent by the second wireless device as part of discovering the second wireless device, and wherein the operations of establishing the peer-to-peer wireless connection with the second wireless device comprises using the peer-to-peer connection parameter.

In Example 24, the subject matter of any one or more of Examples 21-23 optionally include, wherein the operations comprise establishing a protocol connection with the second wireless device using the first wireless connection; and wherein the operations of determining that the second wireless device is capable of switching to the peer-to-peer wireless connection comprises utilizing the protocol connection, the protocol connection being one of: a transport layer protocol or an application layer protocol.

In Example 25, the subject matter of Example 24 optionally includes, wherein the protocol connection is a Transport Control Protocol (TCP).

In Example 26, the subject matter of any one or more of Examples 24-25 optionally include, wherein the protocol connection is a Real Time Streaming Protocol.

In Example 27, the subject matter of any one or more of Examples 24-26 optionally include, wherein the operations comprise determining a peer-to-peer connection parameter using the protocol connection; and wherein the operations of establishing the peer-to-peer wireless connection comprises using the peer-to-peer connection parameter.

In Example 28, the subject matter of any one or more of Examples 24-27 optionally include, wherein the operations comprise: streaming a media file to the second wireless device using the first wireless connection using the protocol connection; and subsequent to establishing the peer-to-peer wireless connection with the second wireless device, switching the streaming of the media file from the first wireless connection to the peer-to-peer wireless connection.

In Example 29, the subject matter of Example 28 optionally includes, wherein streaming the media file comprises streaming the media file using a Real Time Transport Protocol (RTP).

In Example 30, the subject matter of any one or more of Examples 21-29 optionally include, wherein the peer-to-peer wireless connection is a Wi-Fi Direct connection.

Example 31 is a wireless device comprising: means for establishing a first wireless connection with a wireless access infrastructure device; means for discovering, using the first wireless connection, a second wireless device, the second wireless device communicatively connected to the wireless access infrastructure device; means for determining that the second wireless device is capable of switching to a peer-to-peer wireless connection using a communication protocol that is above a Medium Access Control Protocol in a protocol stack; and means for establishing a peer-to-peer wireless connection with the second wireless device.

In Example 32, the subject matter of Example 31 optionally includes, wherein the means for determining that the second wireless device is capable of switching to the peer-to-peer wireless connection comprises means for using information in a discovery protocol message sent by the second wireless device as part of discovering the second wireless device.

In Example 33, the subject matter of any one or more of Examples 31-32 optionally include means for determining a peer-to-peer connection parameter using information in a discovery protocol message sent by the second wireless device as part of discovering the second wireless device, and wherein the means for establishing the peer-to-peer wireless connection with the second wireless device comprises using the peer-to-peer connection parameter.

In Example 34, the subject matter of any one or more of Examples 31-33 optionally include: means for establishing a protocol connection with the second wireless device using the first wireless connection, wherein the means for determining that the second wireless device is capable of switching to the peer-to-peer wireless connection comprises means for utilizing the protocol connection, the protocol connection being one of: a transport layer protocol or an application layer protocol.

In Example 35, the subject matter of Example 34 optionally includes, wherein the protocol connection is a Transport Control Protocol (TCP).

In Example 36, the subject matter of any one or more of Examples 34-35 optionally include, wherein the protocol connection is a Real Time Streaming Protocol.

In Example 37, the subject matter of any one or more of Examples 34-36 optionally include: means for determining a peer-to-peer connection parameter using the protocol connection; and wherein the means for establishing the peer-to-peer wireless connection comprises means for using the peer-to-peer connection parameter.

In Example 38, the subject matter of any one or more of Examples 34-37 optionally include: means for streaming a media file to the second wireless device using the first wireless connection using the protocol connection; and subsequent to establishing the peer-to-peer wireless connection with the second wireless device, means for switching the streaming of the media file from the first wireless connection to the peer-to-peer wireless connection.

In Example 39, the subject matter of Example 38 optionally includes, wherein streaming the media file comprises streaming the media file using a Real Time Transport Protocol (RTP).

In Example 40, the subject matter of any one or more of Examples 31-39 optionally include, wherein the peer-to-peer wireless connection is a Wi-Fi Direct connection.

What is claimed is:

1. A non-transitory machine readable medium comprising instructions, which when performed by a first wireless device cause the first wireless device to perform operations comprising:
    establishing a first wireless connection with a wireless access infrastructure device;
    discovering, using the first wireless connection, a second wireless device, the second wireless device communicatively connected to the wireless access infrastructure device;
    establishing a first media streaming session with the first wireless device as a source device and the second wireless device as a sink device and wherein media is streamed from the first wireless device through the wireless access infrastructure device to the second wireless device;
    determining that the second wireless device is capable of a peer-to-peer wireless connection using a communication protocol that is above a Medium Access Control Protocol in a protocol stack;
    responsive to determining that the second wireless device is capable of the peer-to-peer wireless connection, establishing the peer-to-peer wireless connection with the second wireless device;
    establishing a second media streaming session over the peer-to-peer wireless connection;
    responsive to establishing the second media streaming session, switching streaming the media over the first media streaming session to the streaming the media over the second media streaming session, wherein switching streaming the media comprises leaving the first media streaming session open without transmitting the media over the first media streaming session;
    determining, after switching the stream of the media from the first media streaming session to the second media streaming session, that the peer-to-peer wireless connection is unreliable based upon one or more metrics corresponding to the peer-to-peer wireless connection; and
    responsive to determining that the peer-to-peer wireless connection is unreliable, switching the media stream back to the first media streaming session from the second media streaming session.

2. The non-transitory machine readable medium of claim 1, wherein the operations of determining that the second wireless device is capable of the peer-to-peer wireless connection comprises using information in a discovery protocol message sent by the second wireless device as part of discovering the second wireless device.

3. The non-transitory machine readable medium of claim 1, wherein the operations further comprise determining a peer-to-peer connection parameter using information in a discovery protocol message sent by the second wireless device as part of discovering the second wireless device, and wherein the operations of establishing the peer-to-peer wireless connection with the second wireless device comprises using the peer-to-peer connection parameter.

4. The non-transitory machine readable medium of claim 1, wherein the operations of establishing the first media streaming session comprise establishing a protocol connection with the second wireless device using the first wireless connection; and
    wherein the operations of determining that the second wireless device is capable of switching to the peer-to-peer wireless connection comprises utilizing the protocol connection, the protocol connection being one of: a transport layer protocol or an application layer protocol.

5. The non-transitory machine readable medium of claim 4, wherein the protocol connection is a Transport Control Protocol (TCP).

6. The non-transitory machine readable medium of claim 4, wherein the protocol connection is a Real Time Streaming Protocol.

7. The non-transitory machine readable medium of claim 1, wherein establishing the first media streaming session comprises utilizing a Real Time Transport Protocol (RTP).

8. The non-transitory machine readable medium of claim 1, wherein the peer-to-peer wireless connection is a peer-to-peer wireless connection according to a Wi-Fi Direct standard.

9. A first wireless device comprising:
    a processor;
    a memory communicatively coupled to the processor and comprising instructions, which when performed by the processor causes the processor to perform the operations comprising:
    establishing a first wireless connection with a wireless access infrastructure device;
    discovering, using the first wireless connection, a second wireless device, the second wireless device communicatively connected to the wireless access infrastructure device;
    establishing a first media streaming session with the first wireless device as a source device and the second wireless device as a sink device and wherein media is streamed from the first wireless device through the wireless access infrastructure device to the second wireless device;
    determining that the second wireless device is capable of a peer-to-peer wireless connection using a communication protocol that is above a Medium Access Control Protocol in a protocol stack;
    responsive to determining that the second wireless device is capable of the peer-to-peer wireless connection, establishing the peer-to-peer wireless connection with the second wireless device;
    establishing a second media streaming session over the peer-to-peer wireless connection;
    responsive to establishing the second media streaming session, switching streaming the media over the first media streaming session to the streaming the media over the second media streaming session, wherein switching streaming the media comprises leaving the first media streaming session open without transmitting the media over the first media streaming session;

determining, after switching the stream of the media from the first media streaming session to the second media streaming session, that the peer-to-peer wireless connection is unreliable based upon one or more metrics corresponding to the peer-to-peer wireless connection; and responsive to determining that the peer-to-peer wireless connection is unreliable, switching the media stream back to the first media streaming session from the second media streaming session.

10. The first wireless device of claim 9, wherein the operations of determining that the second wireless device is capable of the peer-to-peer wireless connection comprises using information in a discovery protocol message sent by the second wireless device as part of discovering the second wireless device.

11. The first wireless device of claim 9, wherein the operations further comprise determining a peer-to-peer connection parameter using information in a discovery protocol message sent by the second wireless device as part of discovering the second wireless device, and wherein the operations of establishing the peer-to-peer wireless connection with the second wireless device comprises using the peer-to-peer connection parameter.

12. The first wireless device of claim 9, wherein the operations of establishing the first media streaming session comprise establishing a protocol connection with the second wireless device using the first wireless connection; and wherein the operations of determining that the second wireless device is capable of switching to the peer-to-peer wireless connection comprises utilizing the protocol connection, the protocol connection being one of: a transport layer protocol or an application layer protocol.

13. The first wireless device of claim 12, wherein the protocol connection is a Transport Control Protocol (TCP).

14. The first wireless device of claim 12, wherein the protocol connection is a Real Time Streaming Protocol.

15. The first wireless device of claim 12, wherein the operations comprise determining a peer-to-peer connection parameter using the protocol connection; and wherein the operations of establishing the peer-to-peer wireless connection comprises using the peer-to-peer connection parameter.

16. The first wireless device of claim 9, wherein establishing the first media streaming session comprises utilizing a Real Time Transport Protocol (RTP).

17. A method comprising:

at a first wireless device using a processor:

establishing a first wireless connection with a wireless access infrastructure device;

discovering, using the first wireless connection, a second wireless device, the second wireless device communicatively connected to the wireless access infrastructure device;

establishing a first media streaming session with the first wireless device as a source device and the second wireless device as a sink device and wherein media is streamed from the first wireless device through the wireless access infrastructure device to the second wireless device;

determining that the second wireless device is capable of a peer-to-peer wireless connection using a communication protocol that is above a Medium Access Control Protocol in a protocol stack;

responsive to determining that the second wireless device is capable of the peer-to-peer wireless connection, establishing the peer-to-peer wireless connection with the second wireless device;

establishing a second media streaming session over the peer-to-peer wireless connection;

responsive to establishing the second media streaming session, switching streaming the media over the first media streaming session to the streaming the media over the second media streaming session, wherein switching streaming the media comprises leaving the first media streaming session open without transmitting the media over the first media streaming session;

determining, after switching the stream of the media from the first media streaming session to the second media streaming session, that the peer-to-peer wireless connection is unreliable based upon one or more metrics corresponding to the peer-to-peer wireless connection; and responsive to determining that the peer-to-peer wireless connection is unreliable, switching the media stream back to the first media streaming session from the second media streaming session.

18. The method of claim 17, wherein determining that the second wireless device is capable of the peer-to-peer wireless connection comprises using information in a discovery protocol message sent by the second wireless device as part of discovering the second wireless device.

19. The method of claim 17, comprising determining a peer-to-peer connection parameter using information in a discovery protocol message sent by the second wireless device as part of discovering the second wireless device, and wherein establishing the peer-to-peer wireless connection with the second wireless device comprises using the peer-to-peer connection parameter.

20. The method of claim 17, wherein establishing the first media streaming session comprises establishing a protocol connection with the second wireless device using the first wireless connection, wherein determining that the second wireless device is capable of switching to the peer-to-peer wireless connection comprises utilizing the protocol connection, the protocol connection being one of: a transport layer protocol or an application layer protocol.

21. The method of claim 20, wherein the protocol connection is a Transport Control Protocol (TCP).

22. The method of claim 20, wherein the protocol connection is a Real Time Streaming Protocol.

* * * * *